United States Patent Office 3,056,983
Patented Oct. 9, 1962

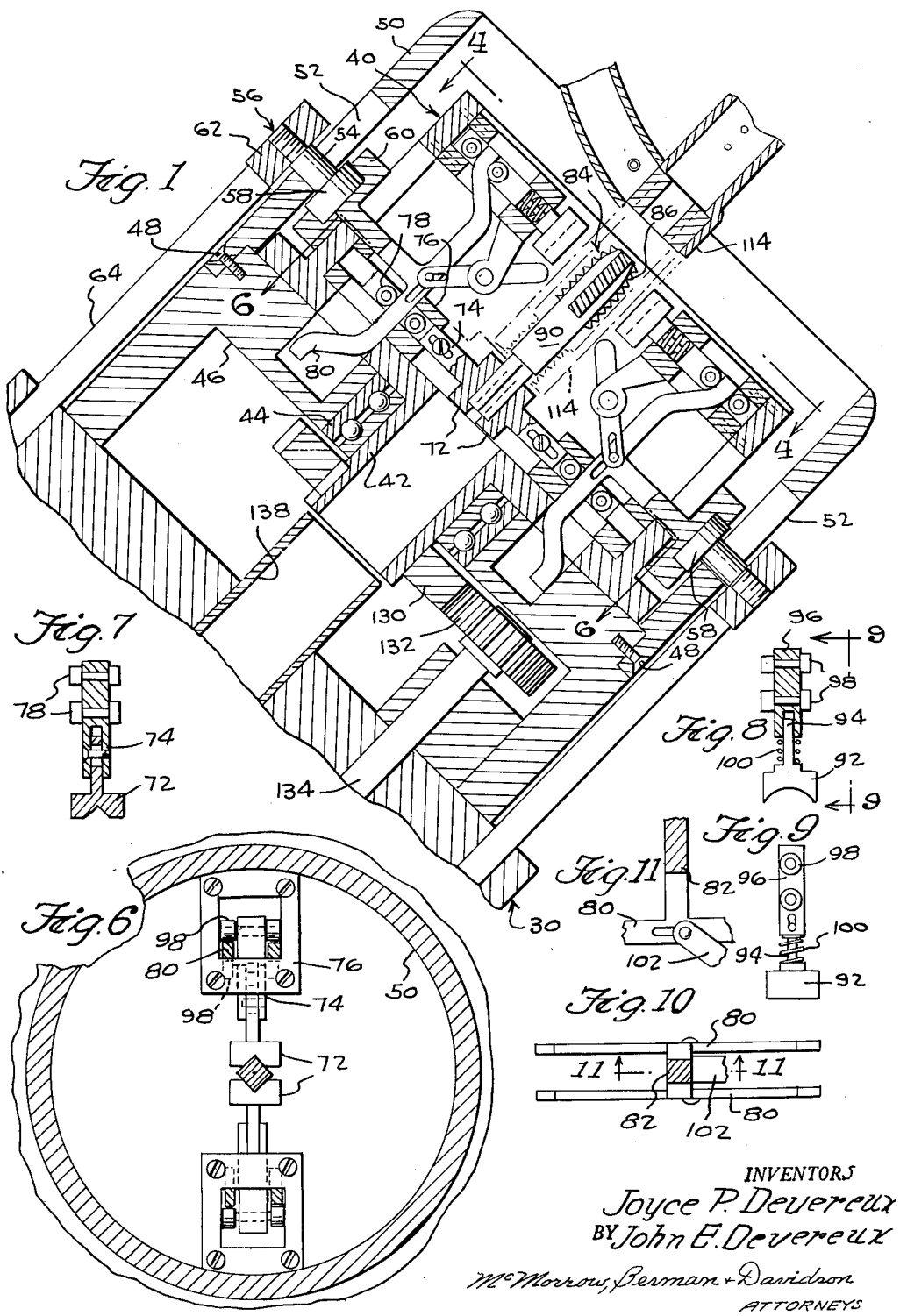

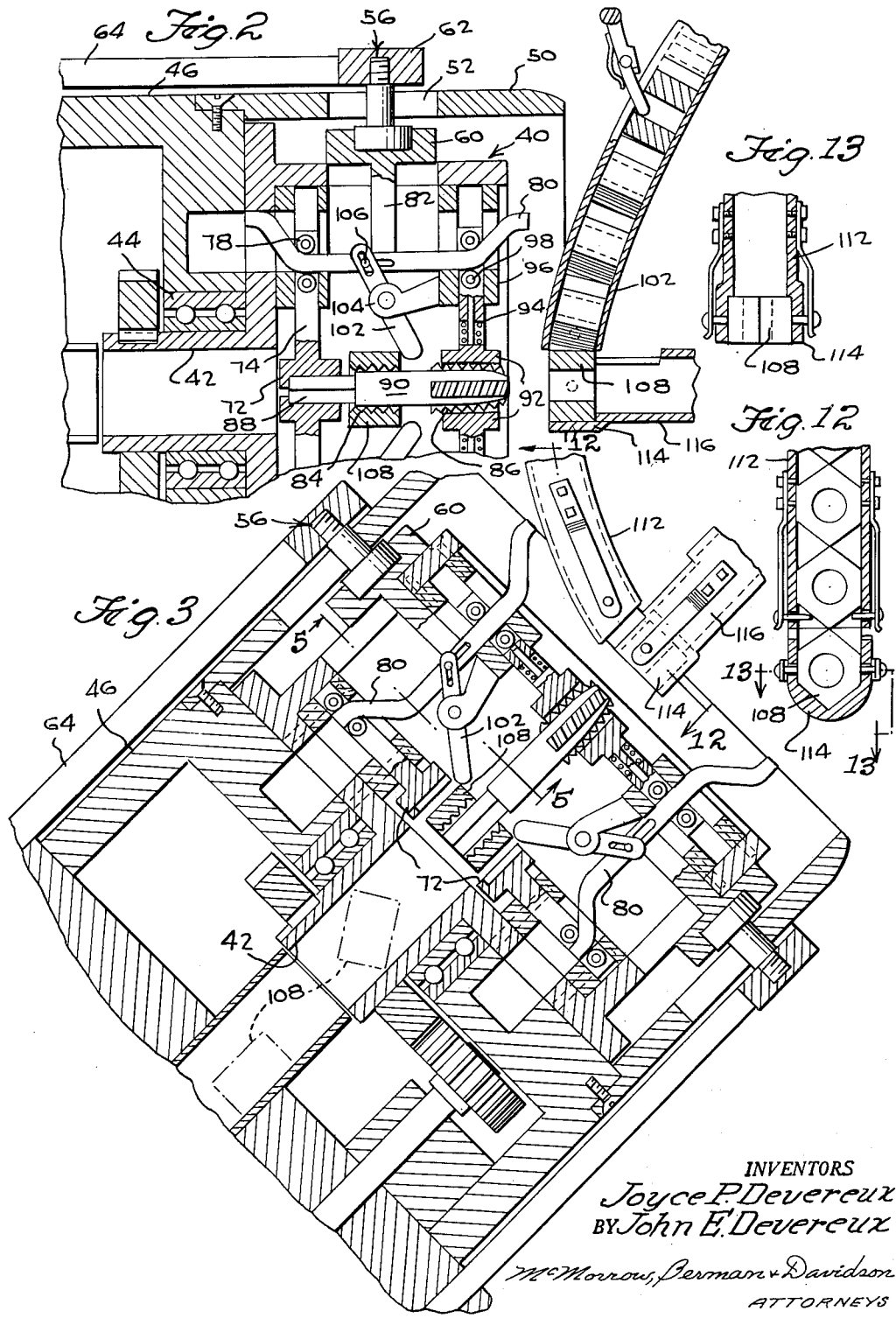

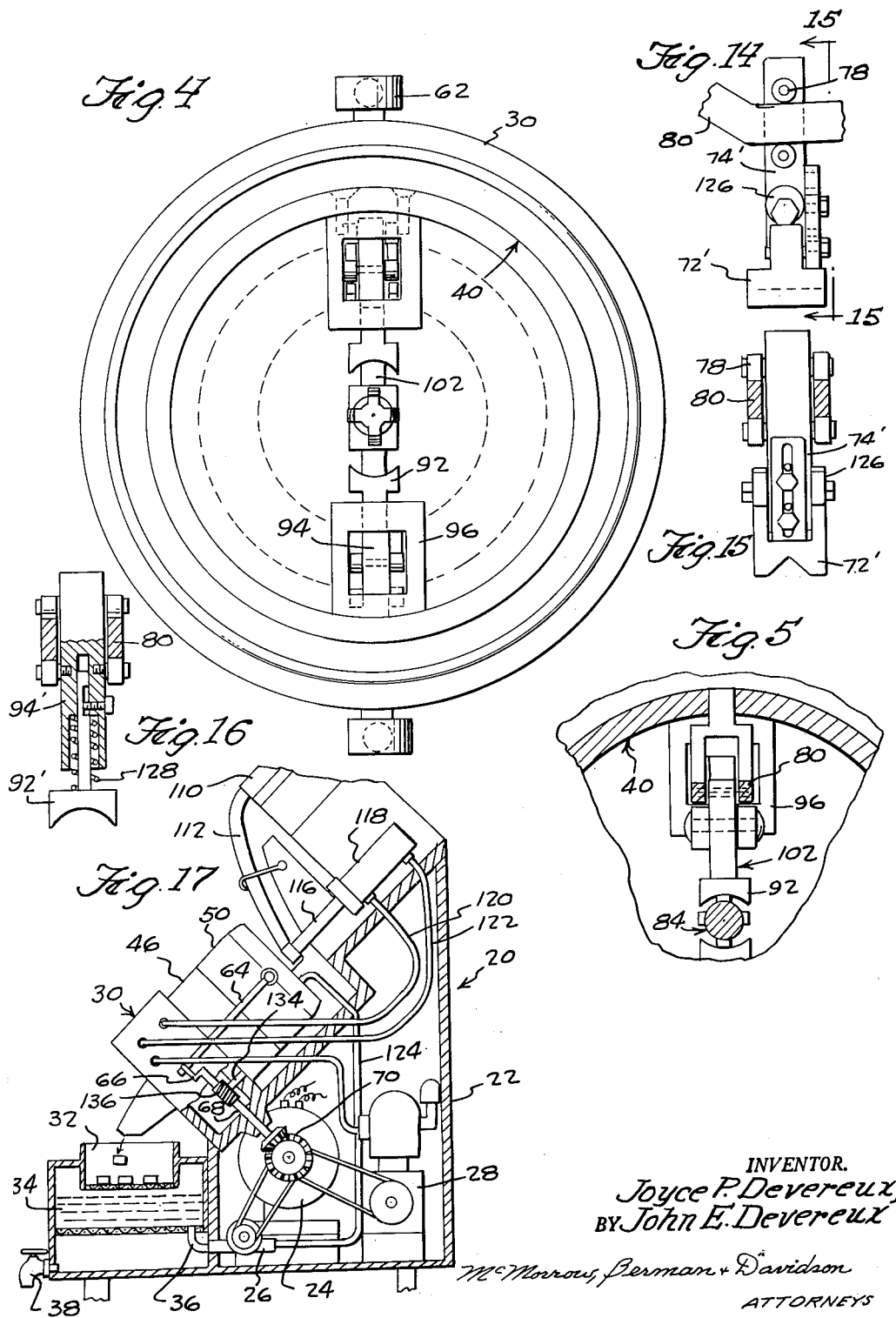

3,056,983
NUT TAPPING MACHINE HAVING DOUBLE TAP
GRIP MEANS AND NUT EJECTOR MEANS
Joyce P. Devereux and John E. Devereux, both of
8532 Cord Ave., Pico Rivera, Calif.
Filed Jan. 29, 1960, Ser. No. 5,526
2 Claims. (Cl. 10—133)

The present invention relates to an automatic nut tapping machine.

Previously proposed and presently in use are automatic nut tapping machines of many designs and employing various principles of operation. Generally, machines proposed or in use have means for feeding a nut blank on to a tap which advances through the nut blank while rotating in one direction and then is withdrawn through and from the nut blank while rotating in the opposite direction. Such a principle of operation is not fully satisfactory for the reason that there is excessive wear on the threads of the tap and frequently the threads cut in the nut blank are mutilated while the tap is reversed and withdrawn.

An object of the present invention is to provide a nut tapping machine which is automatic in operation and one which has a continuously rotating tap successively tapping nut blanks and delivering the same to a delivery chute without reversal of the threads of the taps through the nut.

Another object of the present invention is to provide a nut tapping machine which lends itself to operation at relatively high speed, one which requires little or no attention other than replenishing the supply of nut blanks in the magazine of the machine, and one which is highly effective in action.

A further object of the present invention is to provide an automatic nut tapping machine which is simple in structure, one sturdy in construction and having relatively few components which require a minimum of servicing, and one which is economically feasible.

A still further object of the present invention is to provide, in a nut tapping machine, means for receiving and supporting taps of various sizes.

These and other objects and advantages of the present invention will be fully apparent from the following description when taken in conjunction with the annexed drawings, in which:

FIGURE 1 is a view in section through the arbor of the machine of the present invention, showing the tap supported in the first pair of jaws with the nut shown in dotted lines on the smooth part of the tap;

FIGURE 2 is a fragmentary view of the assembly shown in FIGURE 1, showing a nut in full lines about to be ejected from the smooth part of the tap, the second pair of jaws being shown in embracing engagement with the tap and the first pair of jaws about to be released from the tap;

FIGURE 3 is a view in section showing the tap supported in the second pair of jaws with a nut about to be ejected from the arbor, other nuts being shown in the delivery chute in dotted lines;

FIGURE 4 is a view taken on the line 4—4 of FIGURE 1;

FIGURE 5 is a view taken on the line 5—5 of FIGURE 3;

FIGURE 6 is a view taken on the line 6—6 of FIGURE 1;

FIGURE 7 is a view in section of one of the jaws shown in FIGURE 6;

FIGURE 8 is a view partially in section of one of the jaws shown in FIGURE 5;

FIGURE 9 is a view taken on the line 9—9 of FIGURE 8;

FIGURE 10 is a plan view of one of the slides removed from the arbor;

FIGURE 11 is a view taken on the line 11—11 of FIGURE 10;

FIGURE 12 is a view taken on the line 12—12 of FIGURE 3;

FIGURE 13 is a view taken on the line 13—13 of FIGURE 12;

FIGURE 14 is a view on an enlarged scale of a modified form of the jaw adjusting means employed with the first pair of jaws;

FIGURE 15 is a view taken on the line 15—15 of FIGURE 14;

FIGURE 16 is a view partially in section of a modified form of one of the jaws of the second pair of jaws; and FIGURE 17 is a view of the assembled machine of the present invention, shown partially in section and partially in elevation.

Referring in greater detail to the drawings in which like numerals indicate like parts throughout the several views, the nut tapping machine of the present invention is shown in its entirety in FIGURE 17 and is designated generally by the reference numeral 20. The machine 20 includes a frame or base 22 on which is mounted a motor 24 drivingly connected to an oil pump 26 and to an air compressor or pump 28. A casing 30 having an open upper end is mounted in an upwardly sloping direction on the base 22 with the lower end projecting over and in registry with a drain tray 32 mounted in the upper end of an oil reservoir 34 having an outlet 36 connected to the input side of the pump 26.

A drain cock 38 in the lower end of the reservoir 34 provides a means by which the cutting oil circulated through the machine 20 may be withdrawn when desired.

With reference to FIGURES 1 to 4, inclusive, within the casing 30 is a rotatable arbor 40 having a sleeve portion 42 mounted within a bearing 44. The bearing 44 is supported in the center of a casing extension 46 projecting from the upper end of the casing 30.

Secured by bolts 48 to the free end of the casing extension 46 is a ring 50 having opposed slots 52 therein. Projecting through each slot 52 is the shank 54 of a cam element 56 having its head 58 slidably supported in a grooved ring 60. One part of the shank 54 is threaded and is engaged in a boss 62 on one end of a pitman arm 64. The other end of the pitman arm 64 is operatively connected by means of a crank mechanism 66 and shaft 68 to the motor 24 with suitable gear means 70 connecting the shaft 68 to the motor 24, as shown in FIGURE 17.

A rotary movement imparting means, embodying a first pair of opposed jaws 72, is mounted within the arbor 40 adjacent one end of the sleeve portion 42 for movement therewith. The jaws 72 face each other and have their supporting stems 74 mounted in slideways 76, as shown most clearly in FIGURES 1 and 6.

The stem 74 of each jaw 72 is provided with two pairs of rollers 78 straddling a slide 80 which is formed on the free end of a post 82 projecting perpendicularly inwardly from the ring 60 and formed integrally therewith, as shown most clearly in FIGURES 2, 10, and 11.

A tap 84, provided with a threaded portion adjacent one end, as at 86 in FIGURE 2, and with a square shank portion 88 adjacent the other end, and a smooth intermediate portion or part 90 between the portions 86 and 88, is supported with the portion 88 grippingly held between the jaws 72.

The rotary movement imparting means or jaws 72 are cooperatively disposed with respect to the tap portion 88 and are shiftable into and out of driving engagement with the tap portion 88.

In FIGURE 2, the jaws 72 are shown in driving engagement with the tap portion 88, while in FIGURE 3 the jaws 72 are shown in their out of engagement position.

Supporting means is cooperatively disposed with respect to the tap 84, and particularly the tap portion 86, and is shiftable into and out of embracing engagement with the tap portion 86. Specifically, this means consists in a second pair of jaws 92, arranged in opposed relation, carried on the inner ends of stems 94 which are mounted in slideways 96 projecting inwardly from the arbor 40 adjacent the open end of the latter.

The stem 94 of each jaw 92 carries two pairs of rollers 98 also straddling the adjacent portion of the slide 80, as shown most clearly in FIGURE 2.

With reference to FIGURES 8 and 9, each jaw 92 is connected to its stem 94 for resilient embracing engagement with the tap-threaded portion 86, there being a coil spring 100 biasing the jaw 92 away from the adjacent stem 94 and supporting slideway 96.

Ejector means is cooperatively mounted with respect to the smooth part 90 of the tap 84. This ejector means consists in a lever 102 supported intermediate its ends on a bracket 104 which projects inwardly from each of the slideways 96 carried by the arbor 40. One end portion of the lever 102 is slotted and receives a pin 106 carried by the slide 80, the latter also being slotted for support of the pin 106 to form a lost motion connection between the slide 80 and the lever 102.

The inner end portion of the lever 102 engages with a tapped or threaded nut 108 when the latter is slidable on the smooth part 90 of the tap 84.

A magazine 110 is arranged so that the discharge end of its chute 112 is arranged adjacent to and in linear alignment with the adjacent end of the tap 84. A plurality of nuts 108, in blank form, are arranged in stacked relation within the magazine 110 with the lowermost one in spaced registering alignment with the adjacent end of the tap 84.

Blank nut engaging means is normally positioned on the side of the lowermost one of the nut blanks remote from the tap end and is operable to feed the lowermost nut blank on to the tap end, over the tap threaded portion 86, and on to the smooth part 90. This blank nut engaging means consists in a socket element 114 carried on the free end of an air operated piston 116 for traveling movement toward the tap 84 to a dotted line position shown in FIGURE 1, in which the nut blank carried thereby is on the smooth portion or part 90 of the tap 84 and has been provided with internal threads by engagement with the threaded portion 86 of the tap 84.

The air piston 116 is slidably mounted within an air cylinder 118 (FIGURE 17), the ends of which alternatingly receive air through conduits 120 or 122 as controlled by suitable valve means within the casing 30, the valve means being triggered by conventional stop mechanism and switches so that cyclically the piston 116 carries a nut 108 in blank from the discharge end of the chute 112 on to the tap 84, over the smooth part of the tap 84 and into a position where the ejector lever 102 engages the threaded nut and discharges the same over the portion 88 of the tap 84, the jaws 92 having been moved to the position engaging the tap portion 86 by the same cyclic motion of the control means by shifting of the pitman arms 64 outwardly and shifting movement of the ring 60 so that the slides 80 carry the rollers 78 and 98 to move the jaws 92 inwardly and then to move the jaws 72 outwardly to the out of engagement position with respect to the tap portion 88.

The aforesaid control means is conventional and is not further described for reasons of simplicity as not forming a part of the present invention.

Another conduit 124 extends from the outlet side of the pump 26 to a point adjacent the tap 84 and serves to supply cutting fluid or oil to the tap 84, returning to the drain tray 32 through the discharge end of the casing 30.

With reference to FIGURES 14 and 15, a modified form of the adjusting means is shown for adjustably positioning the jaws 72' toward and away from each other. This means consists in an eccentric 126 mounted upon the stem 74' and rotatable after suitable stud elements are loosened so that the jaws 72' may be moved into and out of tighter engagement with the shank portion of a tap, the latter being therefore variable in size as desired.

With reference to FIGURE 16, a modified form of the supporting means or jaw 92' is shown in which the stem 94 has a bore extending inwardly from the free end thereof for receiving therein a portion of a coil spring 128. This mounts the jaws 92' for resilient embracing engagement of the jaw 92' with the threaded portion of a tap and thereby protects the threads of the tap against breakage due to tight embracing.

The portion of the sleeve 42 projecting inwardly of the casing extension 46 has keyed thereto a spur gear 130 which is drivingly engaged by a pinion 132 on one end of a shaft 134. The other end portion of the shaft 134 has a gear thereon engaged by a worm 136 from the shaft 68, as shown in FIGURE 17, the last-named gear not being shown for reasons of simplification.

In operation, a supply of nuts in blank form is arranged in stacked relation within the magazine 110 and permitted to travel one at a time down the chute 112 where they are carried one at a time by the socket element 114 on to the tap threaded portion 86 and on to the smooth part 90. The cyclic control of the machine 20 effects the opening of the jaws 72 by movement outwardly of the pitman arms 64 to release the adjacent end of the tap 84. Prior to this, the jaws 92 have moved into embracing engagement with the threaded portion 86 of the tap 84 and, after take-up of the lost motion connection of the lever 102 to the ring 60, the lever 102 tilts and engages the threaded nut 108 and causes the same to travel from the smooth part 90 of the tap 84 over the portion 88 and into the interior of the sleeve 42, thence by way of a chute 138 within the casing 30 to the drain tray 32 along with the used cooling or cutting oil which drains from the tray 32 to the reservoir 34 for reuse.

What is claimed is:

1. In a nut tapping machine, a rotatable arbor, a hollow sleeve portion on said arbor, a tap disposed adjacent said sleeve portion and in linear alignment with said sleeve portion, a rotary movement imparting means embodying a first pair of opposed jaws operatively disposed with respect to said tap and shiftable into and out of driving engagement with said tap, a supporting means embodying a second pair of opposed jaws cooperatively disposed with respect to said tap and spaced longitudinally from said first pair of jaws and shiftable into and out of embracing engagement with respect to said tap, an ejector means embodying a lever pivoted intermediate its ends on said arbor and having one end adapted to contact a threaded nut cooperatively mounted on opposite sides of said tap and having said one end adjacent said tap, a ring reciprocably mounted on said arbor, means embodying a slide carried by said ring and extending between and connected to each of the adjacent jaws of said first and second pairs of jaws and having the other end of said lever connected thereto for limited reciprocatory movement connecting said rotary movement imparting means, said supporting means, and said ejector means together so that in sequence the supporting means is shifted into embracing engagement with said tap, said rotary movement imparting means is shifted to the out-of-driving engagement position, and said ejector means is actuated to have said one end of said lever shift a threaded nut when supported on said tap off of said tap, and means operatively connected to said ring for effecting reciprocation of the latter.

2. The nut tapping machine according to claim 1 wherein the other end of each of said levers is connected to the adjacent slide for limited reciprocatory movement by a pin and slot means.

References Cited in the file of this patent

UNITED STATES PATENTS

| | | |
|---|---|---|
| 227,558 | McLane | May 11, 1880 |
| 1,891,721 | Mercadante et al. | Dec. 20, 1932 |